United States Patent
Blädel et al.

[11] Patent Number: 6,048,940
[45] Date of Patent: Apr. 11, 2000

[54] LAYERED PRODUCT

[75] Inventors: Hermann Blädel, Emmerting; Gerd Grossmann, Kastl; Michael Dadalas, Eggenfelden, all of Germany

[73] Assignee: Dyneon GmbH, Germany

[21] Appl. No.: 09/125,748

[22] PCT Filed: Mar. 15, 1997

[86] PCT No.: PCT/EP97/01319

§ 371 Date: Aug. 25, 1998

§ 102(e) Date: Aug. 25, 1998

[87] PCT Pub. No.: WO97/35917

PCT Pub. Date: Oct. 2, 1997

[30] Foreign Application Priority Data

Mar. 22, 1996 [DE] Germany ............. 196 11 311

[51] Int. Cl.[7] .................................. C08L 27/12
[52] U.S. Cl. .......................... 525/199; 525/104
[58] Field of Search ............. 524/502; 525/199, 525/104

[56] References Cited

U.S. PATENT DOCUMENTS

| | | |
|---|---|---|
| 3,817,951 | 6/1974 | Robinson ............ 260/80.77 |
| 4,041,207 | 8/1977 | Takada et al. ............ 428/421 |
| 4,335,238 | 6/1982 | Moore et al. ............ 526/254 |
| 4,361,608 | 11/1982 | Furukawa ............ 428/36 |
| 4,652,592 | 3/1987 | Kawashima ............ 522/117 |
| 4,696,725 | 9/1987 | Ochiai ............ 252/62.54 |
| 4,828,923 | 5/1989 | Nakagawa ............ 428/422 |
| 4,942,202 | 7/1990 | Zama ............ 525/104 |
| 4,942,906 | 7/1990 | Igarashi et al. ............ 138/126 |
| 4,975,139 | 12/1990 | Sugimoto ............ 156/307.1 |
| 5,026,583 | 6/1991 | Nakagawa ............ 428/36.8 |
| 5,194,322 | 3/1993 | Doran ............ 428/267 |
| 5,457,158 | 10/1995 | Caporiccio ............ 525/102 |
| 5,480,930 | 1/1996 | Gentle ............ 524/414 |
| 5,554,689 | 9/1996 | Langstein ............ 525/102 |
| 5,898,051 | 4/1999 | Kawashima ............ 525/71 |

FOREIGN PATENT DOCUMENTS

| | | | |
|---|---|---|---|
| 0 428 158 A2 | 11/1990 | European Pat. Off. | C08L 21/00 |
| 1 355 595 | 6/1974 | United Kingdom | C08F 15/40 |
| WO 96/18665 | 6/1996 | WIPO | C08F 214/18 |

*Primary Examiner*—Paul R. Michl
*Attorney, Agent, or Firm*—James V. Lilly

[57] ABSTRACT

Sheet-like structures comprising rubber layers and fluoropolymer layers can be produced by employing, as adhesive layer, a mixture comprising a rubber and a thermoplastic fluoropolymer having a melting point <250° C.

10 Claims, No Drawings

LAYERED PRODUCT

DESCRIPTION

Shaped articles and coverings made from natural and synthetic rubber are widely used in industry. A disadvantage of these materials is their relatively low resistance to aggressive chemicals, in particular at elevated temperatures. There has, therefore, been no lack of attempts to coat rubber with the much more highly resistant fluoropolymers. These attempts failed, however, because the conventional bonding and vulcanization processes do not permit a sufficiently strong bond to the fluoropolymer.

There has also been no lack of attempts to employ fluorinated thermoplastics for this purpose, in particular copolymers of tetrafluoroethylene with such amounts of comonomers that the product is processable from the melt. However, even these copolymers, which in their properties come close to elastomers, do not adhere to rubbers.

Surprisingly, it has now been found that excellent adhesion between rubbers and fluoropolymers can be produced when a formulation comprising a rubber and from 10 to 70% by weight of a thermoplastic fluoropolymer having more than about 35% by weight of units of tetrafluoroethylene and also units of hexafluoropropene and of vinylidene fluoride having a melting point <250° C. is employed as primer layer.

Further aspects and particular embodiments of the invention are explained in greater detail in the claims.

The invention therefore relates to a composition essentially consisting of a rubber and of the thermoplastic fluoropolymer as described.

The terpolymers of tetrafluoroethylene, hexafluoropropene and vinylidene fluoride have thermoplastic properties if they contain more than about 35% by weight of tetrafluoroethylene. Such terpolymers are known, for example, from U.S. Pat. No. 4,335,238 and DE-A 26 35 402 (AU-A 76/16635). Suitable terpolymers comprise from about 40 to about 60% by weight of tetrafluoroethylene, from about 10 to about 40% by weight of hexafluoropropene and from about 10 to about 40% by weight of vinylidene fluoride.

EP-A-0 428 158 relates to a vulcanizable polymer composition made from a crosslinkable hydrocarbon elastomer, a polymer based on vinylidene fluoride and a crosslinking agent. After vulcanization, this can be used to produce a packaging material of increased chemical and heat resistance. A copolymer made from vinylidene fluoride, tetrafluoroethylene and hexafluoropropene, inter alia, is included in the vinylidene-fluoride-based copolymers mentioned.

U.S. Pat. No. 4,942,906 relates to a rubber hose with an outer and an inner rubber layer, the inner layer being composed in its turn of two layers. The layer situated on the inside is formed from a first polymer mixture made from acrylic rubber and from a fluorine-containing resin, and the outer layer is formed from a second polymer mixture which differs from the first polymer mixture and comprises an epichlorohydrin rubber. The fluorine-containing resins listed are homopolymers and tetrafluoroethylene-hexafluoroethylene copolymers, and also ethylene-tetrafluoroethylene copolymers, but no terpolymers.

U.S. Pat. No. 4,041,207 describes a heat-resistant rubber laminate which essentially consists of a rubber layer made from a heat-resistant rubber mixture and a heat-resistant outer layer made essentially from ethylene-fluoropropylene elastomer.

The novel composition thus bonds on the one hand to rubber and on the other hand to (a layer of) the fluoropolymer as described. This fluoropolymer bonds in turn to layers of other fluoropolymers. In this way, layered products of many varied types, comprising layers of rubber and of fluoropolymers and thus combining the properties of these two classes of materials, can be produced.

The fluoropolymers can be mixtures of copolymers of identical type. It is advantageous to use uniform fluoropolymers.

In one aspect, the invention relates to a layered product which includes a layer of the fluoropolymer and a rubber. A layered product of this type can, for example, be built up as follows:

a) an upper layer essentially consisting of the fluoropolymer, and b) the layer as described, essentially consisting of a mixture of a rubber and the fluoropolymer.

The layer a) can adjoin a layer of a fluoropolymer, i.e. a layered product of this type is an intermediate for composite articles. This intermediate can, via layer b), adjoin one or more vulcanization-bound rubber layers.

The invention furthermore relates to layered products in which both outer sides comprise a fluoropolymer, so that a rubber layer is present only internally.

Further embodiments of this principle can be devised by a person skilled in the art according to the respective requirements, depending on whether, for example, the fluoropolymer acting as adhesion promoter meets the requirements for the outer side or whether another fluoropolymer is to be employed as outer side.

The amount of fluoropolymer in the layer b) can vary within wide limits and is usually in the range from 10 to 70% by weight, preferably from 20 to 50% by weight.

Suitable rubbers are, as mentioned, natural and synthetic rubber types, i.e. besides natural rubber, the conventional synthetic rubbers based on butadiene, butadieneacrylonitrile, butadiene-styrene, chloroprene, isoprene, isobutene, ethylene-propylene, ethylene-vinyl acetate, acrylate and epichlorohydrin, and butyl, chlorobutyl, bromobutyl, polysulfide, urethane, fluoro or silicone rubbers, chlorinated and chlorosulfonated polyethylene and hydrogenated acrylonitrile-butadiene rubber.

The novel layered products can be produced by mixing a rubber with the fluoropolymer or incorporating one component into the other, for example by kneading, then producing a sheet-like or three-dimensional structure from this mixture, vulcanizing this, if desired with a layer of rubber, and then applying the fluoropolymer to at least one layer and fixing it.

The fluoropolymer can be applied by conventional methods as a powder, in the form of a film, melt or as a liquid formulation, for example as a solution or dispersion.

The following materials were employed:

a) A terpolymer consisting of 42% of tetrafluoroethylene units, 20% of hexafluoropropene units and 38% of vinylidene fluoride units and b) a butyl rubber mixture consisting of 100 parts of rubber, 100 parts of carbon black and 100 parts of filler (primarily kaolin). The rubber is petroleum-soluble and is vulcanized at 143° C.

EXAMPLE 1

A mixture of 80% of rubber mixture and 20% of terpolymer is prepared and vulcanized in several layers. The layers show very good adhesion.

EXAMPLE 2

A mixture as in Example 1 is converted into a layer and vulcanized with a layer consisting only of the rubber mixture. Once again, the layer shows very good adhesion after vulcanization, i.e. the layer containing the terpolymer imparts very good adhesion to the layer of the rubber mixture.

Using the layer comprising the terpolymer, the layered product thus obtained can be treated in a separate step with a layer of fluoropolymer.

EXAMPLE 6

A composite is produced as in Example 5, a solution of the terpolymer in methyl ethyl ketone is applied to the layer containing the terpolymer and the solvent is evaporated. A film of a second terpolymer of the following composition is applied onto the surface-coating layer thus obtained and vulcanized:

57% of tetrafluoroethylene units,

30% of hexafluoropropene units and

13% of ethylene units.

A composite having good adhesion is obtained.

What is claimed is:

1. A composition essentially consisting of a rubber and an adhesion promoter comprising a thermoplastic fluoropolymer having units of tetrafluoroethylene, hexafluoropropene and vinylidene fluoride and a melting point <250° C.

2. A composition as claimed in claim 1, wherein the content of adhesion promoter is from 10 to 70% by weight, preferably from 20 to 50% by weight.

3. A layered product including a layer of a composition as claimed in claim 1.

4. A layered product as claimed in claim 3, in which the layer is bonded to a layer of rubber.

5. A layered product as claimed in claim 3, in which the layer is bonded to a layer of adhesion promoter.

6. A layered product essentially consisting of a rubber layer, bonded on both sides to a layer as claimed in claim 3, where, if desired, one or both of the outer layers is/are bonded to a layer of adhesion promoter and, if desired, one or both of these layers of adhesion promoter is/are bonded to a further layer of another fluoropolymer.

7. A layered product as claimed in claim 3, in which the layer is bonded on the one hand to a rubber layer and on the other hand to a layer of adhesion promoter, which, if desired, is bonded to a layer of another fluoropolymer.

8. A composition according to claim 1 wherein the rubber comprises a fluoroelastomer.

9. A composition according to claim 1 wherein the rubber comprises a silicone rubber.

10. A composition according to claim 1 wherein the rubber is selected from a group consisting of natural rubber; synthetic rubbers based upon butadiene, butadiene-acrylonitrile, butadiene-styrene, chloroprene, isoprene, isobutene, ethylene-propylene, ethylene-vinyl acetate, acrylate and epichlorohydrin; butyl, chlorobutyl, bromobutyl, polysulfide, urethane rubbers; chlorinated and chlorosulfonated polyethylene; and hydrogenated acrylonitrile-butadiene rubber.

* * * * *

UNITED STATES PATENT AND TRADEMARK OFFICE
CERTIFICATE OF CORRECTION

PATENT NO. : 6,048,940
DATED : April 11, 2000
INVENTOR(S) : Hermann Blädel, Gerd Grossmann, Michael Dadalas It is certified that error appears in the above-identified patent and that said Letters Patent is hereby corrected as shown below:

Column 2,
Line 50, after the word "dispersion." add the following section which was omitted from the printed patent:
-- Such methods include spraying, casting or knife-coating, which are familiar to a person skilled in the art.

The further stages of processing of the article thus obtained are also familiar to a person skilled in the art, who would match the detailed conditions to the particular circumstances.

The layered products thus obtained combine the advantages of the fluoropolymer outer layer, i.e. in particular chemical and heat resistance and non-stick properties, with the flexibility and associated mechanical resistance of the rubber lower layer and/or rubber intermediate layer. Such layered products can be used in many applications, since for example fluoropolymer layers with a certain rigidity can now be provided with an elastic rubber backing. Such layered products can therefore find application in the construction of chemical equipment and in the automobile industry, seal technology, in compensators, hoses and feed pipes.

The invention is described in greater detail in the following examples.

EXAMPLES
Unless otherwise stated, all percentages given below refer to percentages by weight. --.

Column 3,
Line 7, after the sentence "a layer of fluoropolymer." add the following section which was omitted from the printed patent:
-- Control Example
If the terpolymer is simply sieved onto a layer of the rubber mixture and then a layer of the rubber mixture is laid on top and composite is vulcanized, no adhesion results.
Example 3
A mixture of equal parts of terpolymer and rubber mixture is prepared and the procedure of Example 2 is followed. Very good adhesion results.
Example 4
A layered product is produced as in Example 2, but using the mixture of Example 3: the layered product is therefore a composite, one layer of which contains the terpolymer. The terpolymer is sieved onto this layer to form a thin layer and sintered by heating. The top layer of the terpolymer adheres extremely well to the composite.

UNITED STATES PATENT AND TRADEMARK OFFICE
CERTIFICATE OF CORRECTION

PATENT NO. : 6,048,940
DATED : April 11, 2000
INVENTOR(S) : Hermann Blädel, Gerd Grossmann, Michael Dadalas It is certified that error appears in the above-identified patent and that said Letters Patent is hereby corrected as shown below:

Example 5
A layer consisting of 70% of terpolymer and 30% of rubber mixture is vulcanized and, after the surface has been roughened, is vulcanized with a layer of the rubber mixture. A composite having good adhesion is obtained. --

Signed and Sealed this

Twenty-seventh Day of November, 2001

Attest:

NICHOLAS P. GODICI
*Attesting Officer*     *Acting Director of the United States Patent and Trademark Office*